Patented Sept. 29, 1925.

1,555,246

UNITED STATES PATENT OFFICE.

WILLIAM P. M. GRELCK, OF ST. PAUL, MINNESOTA.

SELF-PRESERVING STOCK FOOD AND PROCESS FOR MAKING THE SAME.

No Drawing. Application filed July 20, 1923. Serial No. 652,852.

*To all whom it may concern:*

Be it known that I, WILLIAM P. M. GRELCK, a citizen of the United States, residing at St. Paul, in the county of Ramsey and State of Minnesota, have invented new and useful Improvements in Self-Preserving Stock Food and Processes for Making the Same, of which the following is a specification.

This invention relates to a food product, particularly though not exclusively intended for consumption by live-stock, in which the outer hulls of grain and lactic acid are combined in such a manner as to render the product highly nutritious and self preserving.

As is well known, the hulls of wheat, commonly called shorts, consists of about 28% of the whole wheat berry, the remaining 72% of the grain being the endosperm. In oats the hull is about 38% and the endosperm about 62% of the whole grain. The hulls of wheat, oats and most other grains contain the greater part of the proteins and mineral matter and also the active substances, known as vitamines, the exact nature of which is unknown. These substances in the hulls have great alimentary value but because of the fact that they are encased in fibrous cell walls, are only partially available for animal nutrition when fed in the usual manner. It is necessary to break up the fibrous portion of the hulls either by chemical or mechanical means before the valuable constituents can be made available for attack in the animal digestive tract. Attempts have been made to break up the fibres by merely grinding the dry hulls, but these attempts have been unsuccessful from a commercial standpoint, not only because the fibres are only slightly affected by such grinding but also because of the excessive cost of the process. However, I have discovered that it is possible, by steeping the hulls in a suitable acid, to so swell and soften the fibres that subsequent grinding will be effective in making available the valuable constituents. Further, the time and power required for the grinding are also reduced by the softening step in the process.

The active matter, or so-called vitamines, are, as is well known, destroyed by the application of heat at temperatures above about 212 degrees Fahrenheit but such matter is preserved and made resistant to heat applied at much higher temperatures by the presence of a proper amount of acid. In the process of the present invention, I preserve practically all of the valuable constituents of the grain hulls in their natural state by always maintaining them in the presence of lactic acid.

It is well known that lactic acid and extracts from the outer hulls of grain, as well as yeast, have great powers of activation. That is, such substances are effective in stimulating the digestive organs so that better digestion of other food stuffs and more complete assimilation thereof results. By the present process a food having excellent activating qualities is produced.

The object of my invention is to provide a highly nutritious and self preserving acid grain food.

A further object of this invention is to provide an efficient and economical process by which the cell walls of grain hulls may be broken and the valuable constituents thereof made accessible to attack by the digestive juices.

It is a further object of the present invention to utilize soured milk, and particularly the whey thereof, in the reduction of grain hulls to highly digestible form and at the same time to produce lactic acid from the milk in sufficient quantities and in such a manner as to act as a preservative in a concentrated grain food for stock.

The whey or soured milk is first placed in a storage tank and heated to from 70 to 100 degrees Fahrenheit (depending upon the time of year), a lactic acid bacteria starter being added. The temperature is maintained between 90 and 100 degrees Fahrenheit for from 36 to 72 or more hours to allow the sugar of milk to ferment and the lactic acid bacteria to generate and multiply to the fullest possible extent. From 1½ to 2 per cent of lactic acid is thus developed in the whey.

I prepare 200 lbs. of soured milk or whey as described above to be used with solid ingredients in the following amounts:

Two to four pounds of oats, from which the endosperm has preferably been removed, is ground and mixed with fifteen to twenty pounds of shorts composed of about 28 per cent of the wheat berry, including 11 per cent bran, 15 per cent middlings and 2 per cent third clear or red dog flour. The grain hulls are next placed in a vat containing about 30 lbs. of the soured milk or whey (having about 2 per cent of lactic acid) prepared as described above. The grain hulls are steeped in this liquid for from 12 to 16 hours and are then ground to a cream-like paste. The steeping facilitates the grinding by softening and swelling the fibres while the grinding breaks down the cell walls to thereby make the valuable carbohydrates, proteins, mineral matter and other constituents accessible for attack by the juices of the alimentary tract.

The remaining 170 lbs. of the soured milk or whey containing about two per cent of lactic acid is now mixed with the grain paste and the mass is pasteurized by heating to about 140–145 degrees Fahrenheit to destroy pathogenic bacteria, the temperature being maintained for about 30 minutes. The pasteurized liquid and grain paste prepared as described above, while warm, is next drawn into the vacuum pan of an evaporator. Heat is now applied to the mass for from 30 to 60 minutes, the temperature being maintained at approximately 140 degrees Fahrenheit, while a sufficient vacuum is maintained to evaporate a part of the water present. During the treatment, the grain mash becomes thoroughly impregnated with lactic acid. When the mass has been reduced to about one-fourth of its original volume, that is to a semi-solid condition, it will contain from 30 to 33 per cent by weight of solid matter, including from 3 to 4½ per cent of lactic acid. The evaporation of the water in the foregoing step of the process may be considered sufficient when the percentage of lactic acid by weight is within the limits just stated, the acid concentration being determined by titration or other suitable test.

Finally, the finished products is removed from the evaporator and packed in air tight barrels or other containers where it is self preserving. The large amount of lactic acid present inhibits further bacterial action so that fermentation is prevented in the containers. The lactic acid is produced in my preferred process by the conversion of a large part of the sugar of milk into acid.

From what has been said, it will be evident that buttermilk, skimmed, or even whole milk, may be used in carrying out the process instead of the whey as described above, without departing from the spirit of the present invention. The whey is preferred, however, because it is a cheap by-product of the cheese manufacturer and contains the necessary constituent, viz, sugar of milk, for the formation of lactic acid.

As an alternate method of procedure, commercial lactic acid, (which is usually obtainable in a 22% solution) may be used in the production of my improved grain food as follows: Thirty lbs. of shorts, five lbs. of oat hulls, twenty lbs. of commercial lactic acid (22% solution) and forty-five lbs. of water are thoroughly mixed and allowed to stand for from 12 to 16 hours to soften and swell the grain fibers. The mass is next ground to a cream-like paste and then heated to a pasteurizing temperature of from 140 to 145 degrees Fahrenheit for about 30 minutes. Finally, the product is packed in air tight containers.

Obviously, the proportions and kinds of grain or grain hulls may be varied substantially from the preferred quantities given without departing from the spirit of my invention.

Having described my invention what I claim as new and desire to protect by Letters Patent is:

1. The process of preparing a self preserving food product which comprises developing the lactic acid content of a quantity of milk and steeping grain hulls in said milk, then grinding the mass to a cream-like paste, subsequently incorporating with said paste an additional quantity of milk containing a substantial amount of lactic acid and finally removing a substantial amount of the water present.

2. The process of preparing a self preserving food product which comprises developing about two per cent of lactic acid in a quantity of milk, subsequently incorporating with said milk a quantity of finely ground grain hulls, and finally eliminating a substantial amount of the water present.

3. The process of preparing a self preserving food product which comprises developing the lactic acid content of a quantity of whey of milk, steeping grain hulls in said whey, then grinding the mass to a cream-like paste, subsequently incorporating an additional quantity of whey containing lactic acid with said paste, then pasteurizing the mass and finally removing much of the water present so that the resultant product has a lactic acid content of more than two and one-half per cent.

4. The process of preparing a self preserving food product which comprises steeping grain hulls in milk whey, then grinding the mass, subsequently incorporating with the mass an additional quantity of whey containing a substantial amount of lactic acid, and evaporating a substantial amount of the water present so that the resulting product contains a preservative quantity of lactic acid.

5. The process of preparing a self preserving food product which comprises steeping grain hulls in the presence of lactic acid, next grinding the mass to a cream-like paste, and finally evaporating a substantial amount of the water present so that the resulting product contains between three and four and one-half per cent of lactic acid.

6. The process of preparing a self preserving food product which comprises developing about one to two per cent of lactic acid in a quantity of milk whey, then steeping grain hulls in said whey, next grinding the mass to a cream-like paste, subsequently incorporating with said paste an additional quantity of whey containing a substantial amount of lactic acid, and finally evaporating the water present until the resulting product contains about one third solids and more than two and one half per cent of lactic acid.

7. A food product containing, finely ground grain hulls, impregnated with a preservative quantity of lactic acid.

8. A food product containing finely ground grain hulls impregnated with milk and containing more than two and one half per cent by weight of lactic acid.

9. A self preserving food product containing from twenty to forty per cent by weight of solid matter, including finely ground grain hulls impregnated with lactic acid and milk, the water content being between 60 and 80 per cent.

In testimony whereof, I have hereunto signed my name to this specification.

WILLIAM P. M. GRELCK.